(12) United States Patent
Ashmeade

(10) Patent No.: US 12,574,654 B1
(45) Date of Patent: Mar. 10, 2026

(54) DISTRIBUTED CAMERA CONTROL ARCHITECTURES

(71) Applicant: Rocket Technology Group LLC, Sevierville, TN (US)

(72) Inventor: Mark Ashmeade, Sevierville, TN (US)

(73) Assignee: Rocket Technology Group LLC, Sevierville, TN (US)

( * ) Notice: Subject to any disclaimer, the term of this patent is extended or adjusted under 35 U.S.C. 154(b) by 0 days.

(21) Appl. No.: 19/349,882

(22) Filed: Oct. 3, 2025

(51) Int. Cl.
| | |
|---|---|
| *H04N 23/90* | (2023.01) |
| *G06F 3/16* | (2006.01) |
| *H04N 23/56* | (2023.01) |
| *H04N 23/60* | (2023.01) |
| *H04N 23/61* | (2023.01) |
| *H04N 23/661* | (2023.01) |
| *H04N 25/47* | (2023.01) |

(52) U.S. Cl.
CPC ............ *H04N 23/90* (2023.01); *G06F 3/167* (2013.01); *H04N 23/56* (2023.01); *H04N 23/61* (2023.01); *H04N 23/64* (2023.01); *H04N 23/661* (2023.01); *H04N 23/665* (2023.01); *H04N 25/47* (2023.01)

(58) Field of Classification Search
None
See application file for complete search history.

(56) References Cited

U.S. PATENT DOCUMENTS

| | | | | |
|---|---|---|---|---|
| 2011/0058036 A1* | 3/2011 | Metzger | ................. | H04N 7/181 |
| | | | | 348/143 |
| 2023/0111337 A1* | 4/2023 | Maltz | ..................... | G06F 16/53 |
| | | | | 707/693 |

OTHER PUBLICATIONS

Hu et al., "A Real Time Dual-Camera Surveillance System Based On Tracking-Learning-Detection Algorithm," 25th Chinese Control and Decision Conference (CCDC), May 25-27, 2013, published on IEEE Jul. 18, 2013.*
Alahi et al., "A Master-Slave Approach for Object Detection and Matching With Fixed and Mobile Cameras," San Diego Conference Oct. 12-15, 2008, published on IEEE Dec. 12, 2008.*
Mohana et al., "Object Detection and Tracking using Deep Learning and Artificial Intelligence for Video Surveillance Applications," (IJACSA) International Journal of Advanced Computer Science and Applications, vol. 10, No. 12, 2019.*

(Continued)

*Primary Examiner* — Michael J Hess
(74) *Attorney, Agent, or Firm* — Miller IP; Devin Miller

(57) ABSTRACT

Described is a system for latency-independent automated image capture. The system includes a sensor network, camera control system, cognitive trigger system, orchestration engine, and hierarchical architecture. Sensor nodes detect events and transmit trigger signals with confidence metrics. The camera system maintains pre-event frame recording, executing capture commands to store both pre- and post-event frames. The system supports simultaneous control of heterogeneous cameras through abstracted interfaces. Cognitive triggers use trainable pattern recognition to reduce false positives. The orchestration engine enables both reactive and predictive multi-camera control based on logical sensor combinations. Hierarchical architecture allows scaling from single-camera setups to multi-zone deployments. By using pre-event buffer recording, the system captures moments that occur before commands are processed, eliminating the impact of latency.

7 Claims, 12 Drawing Sheets

(56) References Cited

OTHER PUBLICATIONS

Manu et al., "Smart Surveillance Camera Using AI," 2024 Second International Conference on Advances in Information Technology (ICAIT-2024).*

Reddy et al., "Detection of Offense and Generating Alerts Using Ai," Matallurgical and Materials Engineering, pp. 1289-1299 (May 2025).*

* cited by examiner

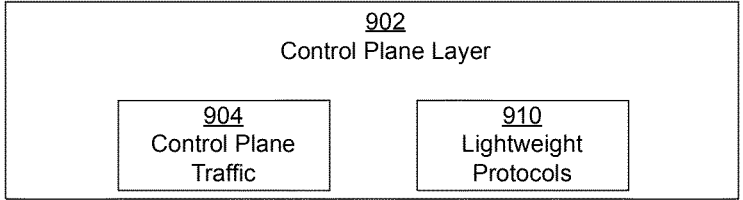
902
Control Plane Layer
904
Control Plane Traffic
910
Lightweight Protocols
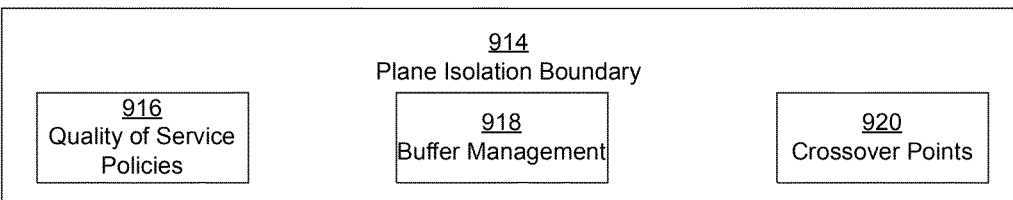
914
Plane Isolation Boundary
916
Quality of Service Policies
918
Buffer Management
920
Crossover Points
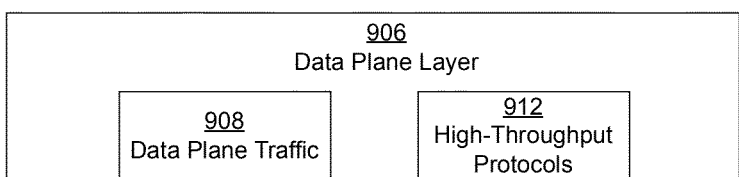
906
Data Plane Layer
908
Data Plane Traffic
912
High-Throughput Protocols
900
FIG. 9

1000

1200

1202 — Receive captured images and video from multiple capture nodes with basic EXIF data and initial trigger metadata 1204 — Analyze pre-buffer sequences using perceptual hashing and motion vector analysis to remove duplicate frames 1206 — Process retained media through multiple AI recognition models: subject identification, action recognition, scene analysis, and quality assessment 1208 — Combine AI classifications with capture context to create enriched metadata tags, hierarchical cateogorizations, and natural language descriptions with confidence scores 1210 — Create derivative versions: thumbnails, proxy files, highlight clips, format transcoding, and HDR tone mapping for different platforms and display requirements 1212 — Route processed media to multiple destinations: cloud synchronization, local archive management, project-based routing, and webhook notifications

FIG. 12

DISTRIBUTED CAMERA CONTROL ARCHITECTURES

BACKGROUND

Traditional camera systems require direct human operation to capture images or video, with the photographer or cinematographer physically pressing a shutter button or activating recording at the moment they observe an event worthy of capture. The field of photography and imaging has experienced significant changes over recent decades. Modern camera systems have incorporated increasing levels of digital control and automation capabilities. The industry continues to develop approaches for camera operation, control systems, and integration with technologies to meet evolving user needs across professional, consumer, and application markets.

BRIEF DESCRIPTION OF THE DRAWINGS

The present description will be understood more fully when viewed with the accompanying drawings of examples of distributed camera control architectures with pre-buffer management. The description is not meant to limit the distributed sensor-triggered camera control platform with pre-buffer management to the specific examples. Rather, the specific examples depicted and described are provided for explanation and understanding of distributed camera control architectures. Throughout the description, the drawings may be referred to as drawings, figures, and/or FIGs.

FIG. 9 illustrates a control plane and data plane separation diagram, according to an embodiment.

FIG. 12 illustrates an event metadata enrichment and intelligent media processing diagram, according to an embodiment.

DETAILED DESCRIPTION

Figure 1:
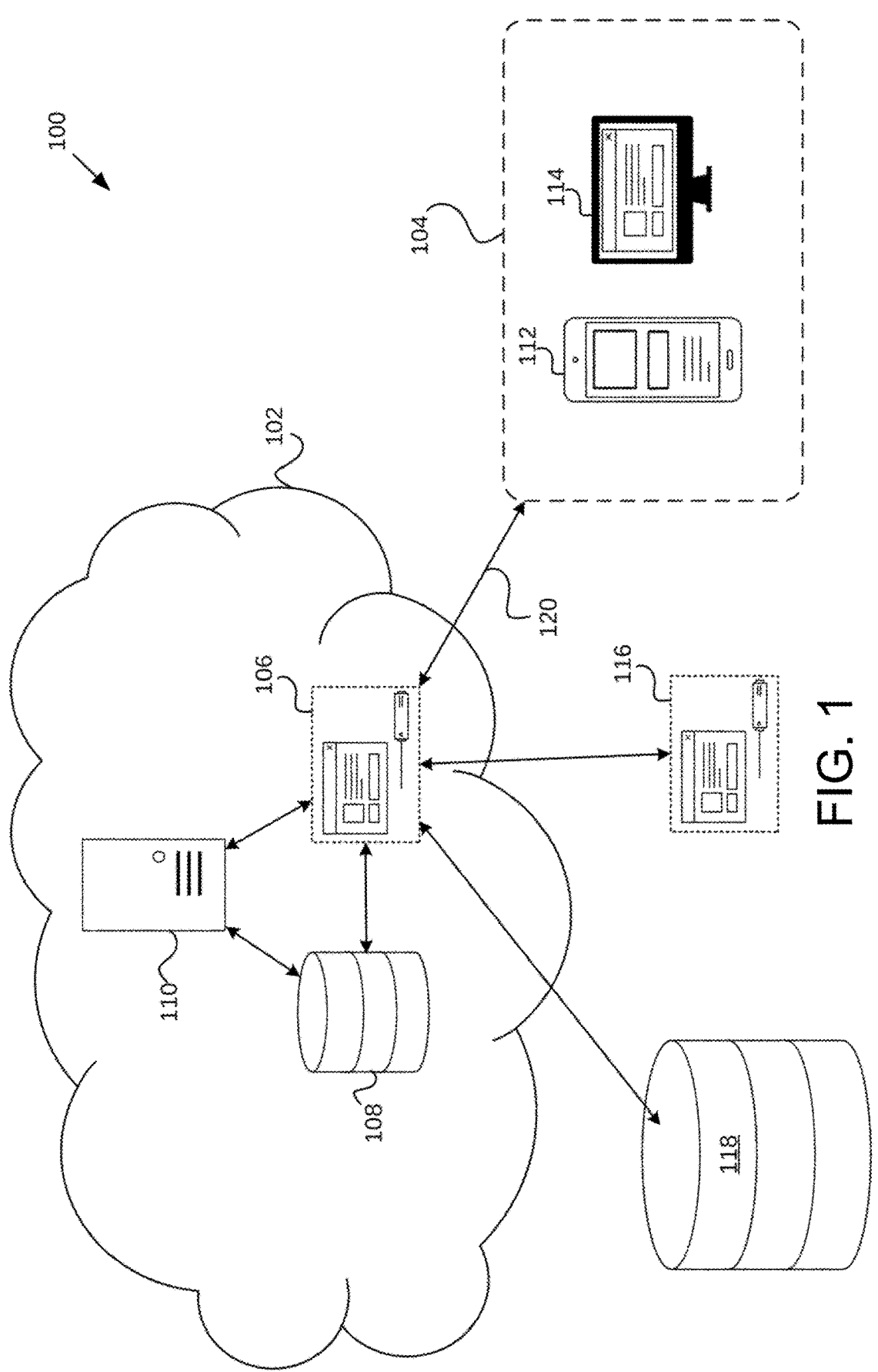
FIG. 1 illustrates a project management system, according to an embodiment.

A distributed sensor-triggered camera control platform with pre-buffer management as disclosed herein will become better understood by reviewing the following detailed description in conjunction with the figures. The detailed description and figures provide merely examples of the various embodiments of distributed camera control architectures with pre-buffer management. Many variations are contemplated for different applications and design considerations; however, for brevity and clarity, all the contemplated variations may not be individually described in the following detailed description. Those skilled in the art will understand how the disclosed examples may be varied, modified, and altered and not depart in substance from the scope of the examples described herein.

A conventional camera triggering system may include a single camera connected to a dedicated trigger device, such as a lightning trigger, sound trigger, or motion sensor, typically through a physical cable or proprietary wireless connection. Current automated capture systems employ simple threshold-based triggers that activate when a basic parameter is exceeded, such as detecting any motion within a defined zone, sensing sound above a certain decibel level, or detecting a change in light intensity. These systems generally operate on a one-to-one basis where trigger controls a single camera, and multi-camera setups require either manual synchronization or multiple independent trigger units. Existing remote camera control applications can connect to multiple cameras but require manual operation to fire them simultaneously and lack the ability to integrate external sensor inputs for automated triggering.

Conventional camera triggering systems suffer from several limitations that represent major unresolved technical problems in computational photography and cinematography. First, inherent system latency between event detection and camera activation means the desired moment has often passed before image capture begins, resulting in missed shots of fleeting events. Second, simple threshold triggers generate excessive false positives, triggering on any movement rather than specific subjects, or any loud sound rather than particular acoustic signatures. Third, existing systems cannot coordinate heterogeneous camera arrays from different manufactures, forcing users into expensive single-vendor ecosystems. Fourth, there is no intelligent management of pre-capture buffer features available in modern cameras, leaving this powerful capability accessible only through manual half-press shutter techniques. Fifth, current systems lack the ability to combine multiple sensor inputs through logical operations or to scale beyond simple point solutions to comprehensive coverage of large areas or complex events.

Implementations of a distributed sensor-triggered camera control platform may address some or all of the problems described above. A distributed sensor-triggered camera control platform may include a network of specialized nodes. These sensor nodes are accompanied with cognitive triggering capabilities, capture nodes managing cameras from multiple manufacturers, control nodes executing logical rules on sensor inputs, storage nodes with intelligent media management, and actuator nodes for physical actions, which are all coordinated through a unified control architecture. The platform may leverage artificial intelligence for discriminating triggers that recognize specific subjects or acoustic signatures, programmatic control of pre-capture buffers to eliminate latency, and hierarchical scaling through super node architecture for system-of-systems deployments.

Generally, disclosed embodiments address these problems by rendering capture latency irrelevant through intelligent pre-buffer management, wherein camera continuously record to internal buffers before events occur and save these pre-event frames upon sensor triggering. The platform applies telecommunications-grade architectural principles, separating control plane operations (low-bandwidth signaling and commands) from data plane operations (high-bandwidth media transfer), enabling reliable scaled deployments. Cognitive sensor nodes move beyond simple thresholds to provide user-trainable recognition of specific visual subjects or acoustic fingerprints, dramatically reducing false positives while enabling capture of precisely targeted events. The system's node-based architecture allows flexible deployment from single-camera setups to stadium-scale installations, with scriptable automation for complex multi-step capture sequences.

FIG. 1 illustrates a project management system 100, according to an embodiment. The system includes internal and external data resources for managing a project. It may reduce memory allocation at client devices and conserve memory resources for application servers.

The project management system 100 may include a cloud-based data management system 102 and a user device 104. The cloud-based data management system 102 may include an application server 106, a database 108, and a data server 110. The user device 104 may include one or more devices associated with user profiles of the project management system 100, such as a smartphone 112 and/or a personal computer 114. The project management system 100 may include external resources such as an external application server 116 and/or an external database 118. The project management system 100 elements may communicate via various communication links 120. An external resource may generally be considered a data resource owned and/or operated by an entity other than an entity that utilizes the cloud-based data management system 102 and/or the user device 104.

The project management system 100 may be web-based. The user device 104 may access the cloud-based data management system 102 via an online portal set up and/or managed by the application server 106. The project management system 100 may be implemented using a public internet. The project management system 100 may be implemented using a private intranet. Elements of the project management system 100, such as the database 108 and/or the data server 110, may be physically housed at a location remote from an entity that owns and/or operates the project management system 100. For example, various elements of the project management system 100 may be physically housed at a public service provider such as a web services provider. The project management system 100 elements may be physically housed at a private location, such as at a location occupied by the entity that owns and/or operates the project management system 100.

The communication links 120 may be direct or indirect. A direct link may include a link between two devices where information is communicated from one device to the other without passing through an intermediary. For example, the direct link may include a Bluetooth® connection, a Zigbee® connection, a Wi-Fi® Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless local area network (WLAN) connection where data is passed through a WLAN router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long-term evolution (LTE) standard, and so forth. "Indirect," when used regarding the communication links 120, may refer to any of the aforementioned indirect communication links.

Figure 2:
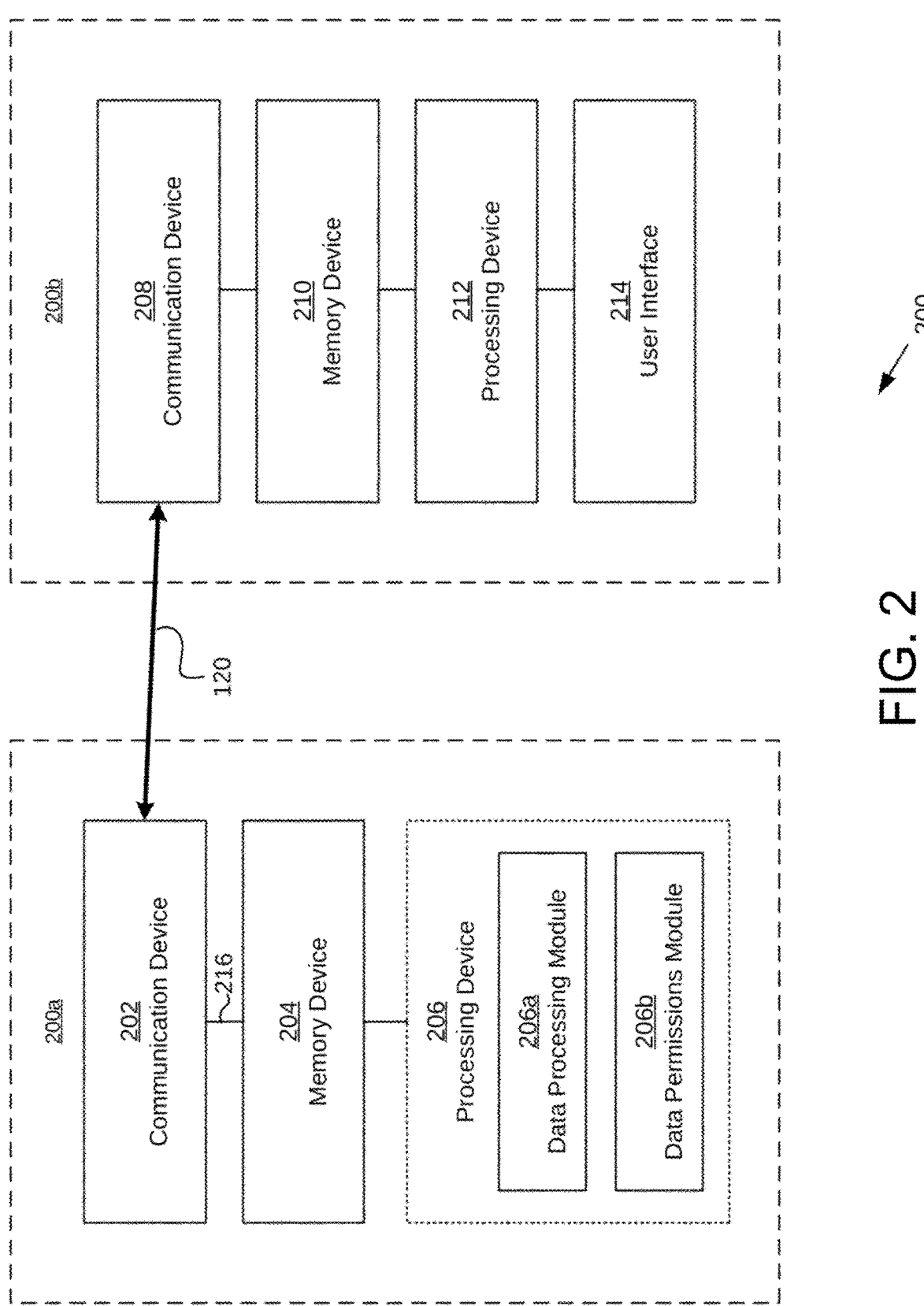
FIG. 2 illustrates a device schematic for various devices used in the project management system, according to an embodiment.

FIG. 2 illustrates a device schematic 200 for various devices used in the project management system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, an address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the input(s) from the client device 200b. The data processing module 206a may retrieve data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may represent the cloud-based data management system 102. The server device 200a may be representative of the application server 106. The server device 200a may be representative of the data server 110. The server device 200a may be representative of the external application server 116. The memory device 204 may be representative of the database 108, and the processing device 206 may be representative of the data server 110. The memory device 204 may be representative of the external database 118, and the processing device 206 may represent the external application server 116. For example, the database 108 and/or the external database 118 may be implemented as a block of memory or memory block in the memory device 204. The memory device 204 may further store instructions that, when executed by the processing device 206, perform various functions with the data stored in the database 108 and/or the external database 118.

Similarly, the client device 200b may represent the user device 104. The client device 200b may be representative of the smartphone 112. The client device 200b may be representative of the personal computer 114. The memory device 210 may store application instructions that, when executed by the processing device 212, cause the client device 200*b* to perform various functions associated with the instructions, such as retrieving data, processing data, receiving input, processing input, transmitting data, and so forth.

As stated above, the server device 200*a* and the client device 200*b* may represent various project management system 100 devices. Various elements of the project management system 100 may include data storage and/or processing capabilities. Such capabilities may be rendered by various electronics for processing and/or storing electronic signals. One or more of the project management system 100 devices may include a processing device. For example, the cloud-based data management system 102, the user device 104, the smartphone 112, the personal computer 114, the external application server 116, and/or the external database 118 may include a processing device. One or more of the project management system 100 devices may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory, and the memory device may have persistent memory. Memory in the processing device may be allocated dynamically according to variables, variable states, static objects, and permissions associated with objects and variables in the project management system 100. Such memory allocation may be based on instructions stored in the memory device. Memory resources at a specific device may be conserved relative to other systems that do not associate variables and other objects with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read information needed to perform the functions from the memory device. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit (NPU), a physics processing unit (PPU), a digital signal processor (DSP), an image signal processor (ISP), a synergistic processing element (SPE), a field-programmable gate array (FPGA), a sound chip, a multi-core processor or microprocessor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various devices in the project management system 100 may include data communication capabilities. Such capabilities may be rendered by various electronics for transmitting and/or receiving electronic and/or electromagnetic signals. One or more of the project management system 100 devices may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port, a USB wire, and/or an RF antenna with Bluetooth® programming installed on a processor, such as the processing component, coupled to the antenna. In another example, the communication component may include an RF antenna and programming installed on a processor, such as the processing device, for communicating over a Wi-Fi® and/or cellular network. As used herein, "communication device," "communication component," and/or "communication unit" may be used generically herein to refer to any or all of the aforementioned elements and/or features of the communication component.

Various elements in the project management system 100 may be referred to as a "server." Such elements may include a server device. The server device may include a physical server and/or a virtual server. For example, the server device may include one or more bare-metal servers. The bare-metal servers may be single-tenant servers or multiple-tenant servers. In another example, the server device may include a bare metal server partitioned into two or more virtual servers. The virtual servers may include separate operating systems and/or applications from each other. In another example, the server device may include a virtual server distributed on a cluster of networked physical servers. The virtual servers may include an operating system and/or one or more applications installed on the virtual server and distributed across the cluster of networked physical servers. In another example, the server device may include more than one virtual server distributed across a cluster of networked physical servers.

The term server may refer to the functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth, may be instantiated in the same operating system and/or on the same server device. Separate servers may be instantiated in the same application or different applications.

Various aspects of the systems described herein may be referred to as "data." Data may refer generically to modes of storing and/or conveying information. Accordingly, data may refer to textual entries in a database table. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer readable. Data may refer to human-readable text.

Various devices in the project management system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

The user interface plays a role in the overall user experience of the project management system 100. A well-designed user interface enhances usability by providing intuitive navigation, clear visual feedback, and efficient access to features and functions. By incorporating advanced display technologies and interactive elements, the system ensures that users can interact with the project management tools effectively and efficiently.

The project management system 100 may also integrate artificial intelligence (AI) and machine learning capabilities to enhance data processing and decision-making processes. AI and machine learning algorithms may analyze project data, predict potential issues, and suggest optimal solutions. These technologies enable the system to learn from past project data and improve its performance and accuracy. Newer types of devices, such as neural processing units (NPUs) and advanced GPUs, may be utilized to accelerate AI and machine learning computations.

The project management system 100 may leverage cloud-based computing resources to provide scalable and flexible data processing and storage solutions. Cloud-based storage systems ensure that project data is securely stored and easily accessible from any location, facilitating collaboration among geographically dispersed teams. Cloud-based networking enables seamless communication and data exchange between the various components of the system, ensuring real-time updates and synchronization. Depending on the system architecture, these cloud-based components may be optional, allowing for flexible implementation based on specific project requirements.

The project management system 100 may utilize mesh network technology to enhance connectivity and reliability. Mesh networks allow for decentralized communication where the node in the network can act as a relay point, ensuring robust and fault-tolerant connections. This is particularly useful in dynamic and large-scale project environments where traditional network infrastructure may be inadequate.

Cybersecurity features may be implements as part of the project management system 100. Robust security measures, such as encryption, secure access controls, and regular security audits, are implemented to protect sensitive project data from unauthorized access and cyber threats. Data integrity and confidentiality is paramount to maintaining user trust and compliance with regulatory standards.

Integrating AI, machine learning, cloud-based computing, cloud-based storage, cloud-based networking, and mesh networks in the project management system 100 represents a significant advancement in project management technology. These innovations enable the system to provide enhanced efficiency, reliability, and scalability, ultimately leading to more successful project outcomes. The project management system 100 may be designed to be scalable and adaptable.

Figure 3:
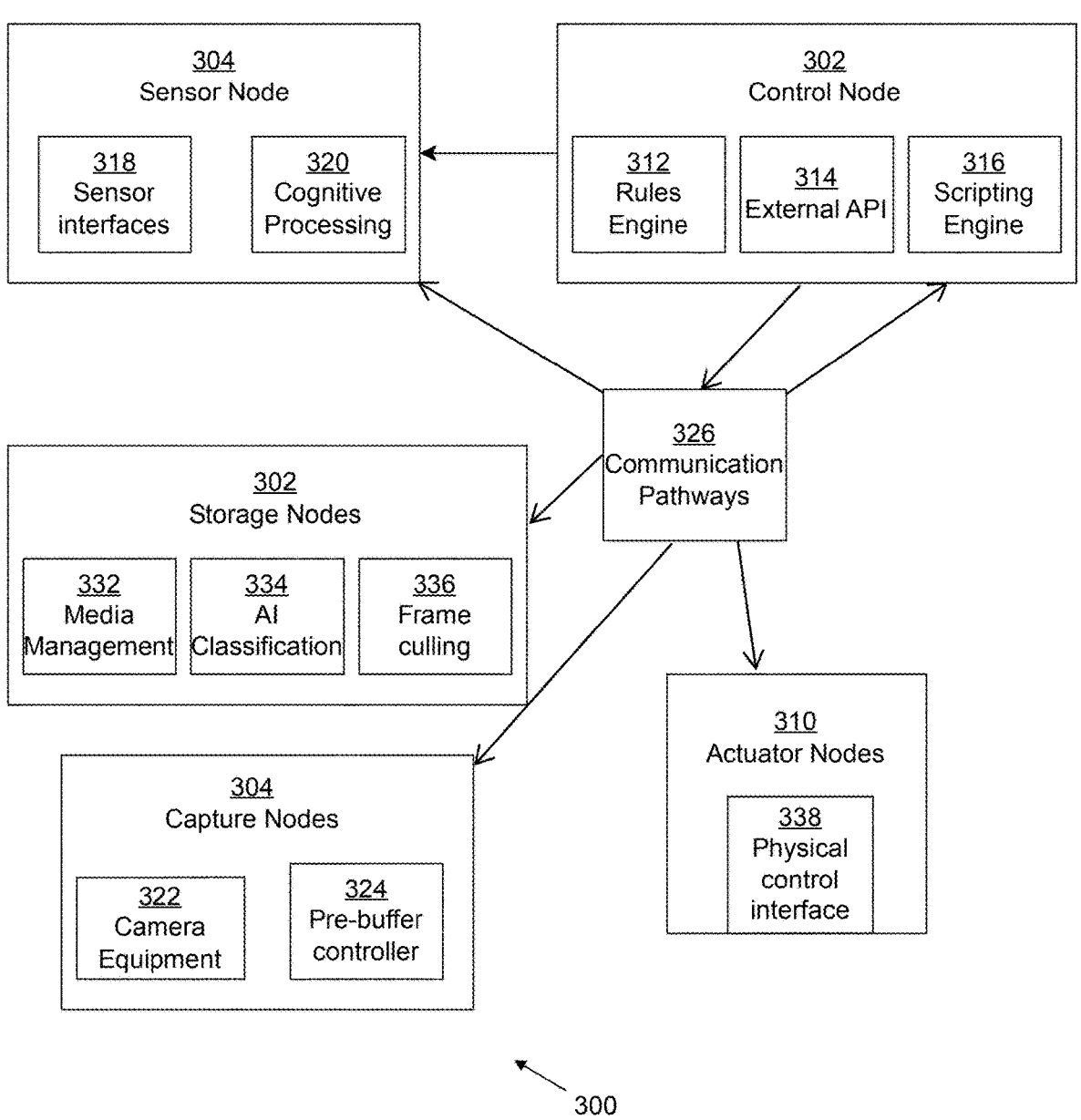
FIG. 3 illustrates a node architecture of a distributed sensor-triggered camera control platform, according to an embodiment.

FIG. 3 illustrates a node architecture block diagram 300 of the distributed sensor-triggered camera control platform, according to an embodiment. The node architecture provides the fundamental framework for distributed intelligence and control across the system. The node architecture block diagram 300 demonstrates how distinct functional nodes communicate and coordinate to achieve zero-latency capture through intelligent pre-buffer management and cognitive triggering.

The node architecture block diagram 300 may include a control node 302, sensor nodes 304, capture nodes 306, storage nodes 308, and actuator nodes 310. The control node 302 may serve as the central processing unit of the system, executing logical rules and coordinating actions across all connected nodes. The control node 302 may include a rules engine 312 for processing Boolean logic operations (AND, OR XOR, NOT), an external API interface 314 for third-party integration, and a scripting engine 316 for executing automated capture sequences.

The sensor nodes 304 may include various sensor interfaces 318 such as camera sensors, microphones, pressure sensors, LiDAR modules, and GPIO pins for external sensor connections. When embodied in a smartphone or tablet such as an iPad, the sensor nodes 304 may utilize integrated sensors including accelerometer, barometric, magnetometer, and gyroscope as triggers. When embodied in a single-board computer such as a Raspberry Pi, the sensor nodes 304 may interface through GPIO pins with pressure plates on bird feeders, photodiode-based tripwires, moisture sensors, Hall effect sensors, reed switches, and directional microphones with amplifier circuitry. The sensor node 304 may include a cognitive processing module 320 that enables artificial intelligence-based triggering, including visual object recognition capable of identifying specific subjects such as a Northern Cardinal while ignoring finches or squirrels, and acoustic fingerprinting capable of recognizing the specific "swoosh" of a falling object or "pop" of a tennis ball strike while ignoring conversation. The cognitive processing module 320 distinguishes the system from simple threshold-based triggers by enabling user-trainable, discriminating event detection.

The capture nodes 306 may interface with heterogeneous camera equipment 322 from multiple manufacturers including but not limited to Sony A9III, Sony A1II, Fujifilm X-T5, and smartphone cameras. The capture node 306 may include a pre-buffer controller 324 that programmatically manages the camera's pre-shoot buffer, including arming commands to initiate recording at up to 120 frames per second for Sony A9III, disarming commands, and timeout management configurable in seconds or minutes to prevent overheating. The pre-buffer controller 324 enables the rendering capture latency irrelevant by maintaining continuous frame recording before trigger events, capturing fleeting moments such as a bird taking flight from a perch or a batter's swing initiated by the ball itself. Furthermore, the pre-buffer controller 324 may be implemented in software on a capture node, such as a smartphone, creating a rolling buffer of frames in system memory to achieve the same zero-latency capture result.

Communication pathways 326 provide connectivity between nodes and specifically link the control node 302 to all capture nodes 306, storage nodes 308, and actuator nodes 310 which may utilize multiple protocols including Bluetooth Low Energy (BLE) for power-efficient local communication, WIFI for higher bandwidth requirements, and Ethernet for wired connections. For example, one camera may be under BLE control while another uses Wi-Fi with a BLE-connected iPhone using laser-based distance sensor (LiDAR) sensing for specific distance triggers useful for precise manual focus, and a Raspberry Pi connected over Wi-Fi with an elaborate laser-LED tripwire trigger. Control plane communications carry low-bandwidth trigger signals and commands, remain separate from data plane communications, which handle high-bandwidth media transfer between capture nodes 306 and storage nodes 308.

In an embodiment, multiple nodes may be co-located and virtualized within a single physical device. For example, on a computing device such as a smartphone equipped with multiple camera modules, a first camera module may function as a sensor node 304 running a cognitive processing module 320, while a second camera module on the same device may concurrently function as a capture node 306 operating with a pre-buffer controller 324. The inter-node communication pathways 326 may occur internally through the device's operating system APIs, allowing the control node 302 to coordinate the latency-agnostic capture system within a single, self-contained unit. The storage nodes 308 may include media management modules 332 for receiving captured images and video from capture nodes 306. When embodied in a smartphone, storage nodes 308 may save images to the local photo library. The storage nodes 308 may include an AI classification module 334 for automatically analyzing and tagging received media with metadata including subject identification such as "Bald Eagle," action classification such as "Landing," and location data such as "Douglas Lake, Tennessee." The storage nodes 308 may further include a frame culling module 336 that intelligently removes redundant pre-buffer frames where no action has occurred, particularly useful when capturing events like a coin drop into water where many identical frames exist before the coin enters the frame.

The actuator nodes 310 may include physical control interfaces 338 for devices such as turntables for 360-degree photogrammetry, solenoids for scientific experiments, and lighting systems. For example, in a photogrammetry application, the control node may command four cameras to shoot, rotate a turntable through an actuator node by three degrees, and repeat the process to capture a full 360-degree shoot. The actuator nodes 310 may operate in coordination with the scripting engine 316 to enable complex automated capture sequences where physical manipulation is synchronized with multi-camera capture events, such as initiating action with a solenoid for scientific experiments demonstrating physics principles like Newton's Third Law or surface tension. In another embodiment, the actuator node 310 can interface with 3D printing systems, enabling reality to digital to physical workflows where objects are photographically captured, digitally reconstructed, and physically reproduced, creating an integrated 3D replication system.

The control node 302 may organize capture nodes into functional groups 340, such as "home plate camera" for a baseball game, "outfield cameras," "pitcher cameras," or "all cameras." Sensor events such as motion detection trained just in front of the batter, detecting the ball's motion as it is pitched may trigger only the home plate group to fire, while avoiding pointless firing of outfield camera groups when no runners are on base. The control node 302 may also connect to the internet to ingest events and notifications from external sources, such as weather alerts for imminent thunderstorms that could arm the system with an ambient light sensor for lightning capture.

Figure 4:
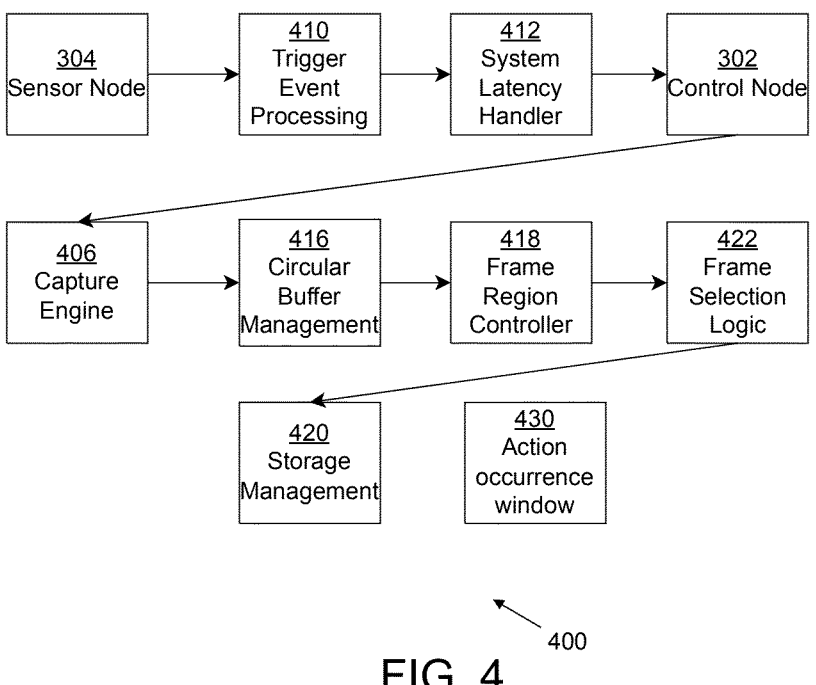
FIG. 4 illustrates a pre-buffer timeline diagram, according to an embodiment.

FIG. 4 illustrates a pre-buffer timeline diagram 400 demonstrating the temporal relationship between frame capture, trigger events, and storage operations, according to an embodiment. The pre-buffer timeline diagram 400 illustrates how the system eliminates the impact of inherent system latency by capturing frames before a trigger event occurs. The pre-buffer timeline diagram 400 demonstrates the rendering capture latency irrelevant through intelligent buffer management, enabling capture of fleeting moments such as a bird taking flight, a rock hitting a water balloon, or a coin entering water.

The pre-buffer system block diagram 400 may include input processing components that initiate the capture sequence. A sensor node 304 performs event detection and generates trigger signals when qualifying events occur. Trigger event processing 410 handles signal transmission, event validation, and priority assignment to ensure reliable trigger signal propagation through the system architecture, with temporal axis representing time progression and time markers indicating regular intervals for system coordination.

Processing components coordinate capture operations in view of system latency between event detection and command execution. The system eliminates or reduces latency through pre-buffer operation: camera continuously record frames to internal buffer memory during armed states, ensuring that action occurring during the latency period is already captured before the capture command is processed. A control node 302 receives processed trigger signals and executes capture activation commands, coordinating system-wide capture operations while managing the temporal gap between trigger detection and camera response.

Buffer management components ensure continuous frame availability despite system latency. A frame capture engine 406 maintains continuous recording of individual frames at predetermined frame rates, such as 120 frames per second, for high-speed capture applications, storing frames in the camera's internal buffer memory during armed states. Circular buffer management 416 handles the pre-trigger buffer region, continuously overwriting older frames in circular buffer fashion until capture commands are received. A frame region controller 418 manages the latency period region containing frames captured during the system latency period, representing the critical moments that would be lost in conventional trigger systems, and the post-command region containing frames captured after the capture command point, ensuring comprehensive temporal coverage of events.

A saved frame indicator selection logic 422 identifies which frames from the frame capture sequence 406 are permanently stored to the camera's storage medium such as an SD card or internal non-removable storage. The saved frames include a selectable number of pre-trigger frames from the pre-trigger buffer region showing the subject at rest, all frames from the latency period region capturing the action initiation, and a configurable number of post-command frames documenting the complete event. Discarded frame indicators identify frames in the pre-trigger buffer region within the circular buffer 416 that are not saved, being continuously overwritten during buffer operation when the photographer releases the half-press without fully pressing the shutter.

An action occurrence window 430 indicates when the actual photographable event occurs, typically beginning shortly after the trigger event marker and extending through the latency period region within the frame region 418. For example, in capturing a coin drop demonstrating surface tension with an "air tunnel" above the coin, or a balloon destruction showing deformation, without pre-buffer capability these scientific demonstration moments would be entirely missed due to system latency 412. The overlap between the action occurrence window 430 and the saved frame regions demonstrates how the embodiment enables one-take captures of impossible shots, such as a coin drop into water, where the system automatically preserves frames showing the coin's approach, entry, and splash pattern.

Storage management 420 determines frame preservation and disposal based on capture requirements. A frame selection logic block 422 identifies frames for permanent storage to the camera's storage medium, including a selectable number of pre-trigger frames from the pre-trigger buffer region, all frames from the latency period region, and a configurable number of post-command frames. A storage management system 420 handles permanent frame preservation while processing discarded frame indicators for frames in the pre-trigger buffer region that are not saved, being continuously overwritten during buffer operation, optimizing storage utilization while preserving critical capture moments.

The action occurrence window 430 contains a detector that identifies when the actual photographable event occurs, typically beginning shortly after the trigger event marker and extending through the latency period region. Without pre-buffer capability, this critical action would be entirely missed due to system latency. The block diagram demonstrates how the overlap between the action occurrence window 430 and the saved frame regions enables the invention to capture the complete event despite system latency, rendering capture latency irrelevant through intelligent buffer management and coordinated component interaction.

The pre-buffer timeline diagram 400 may further illustrate timeout protection features preventing indefinite buffer arming that would cause overheating. A configurable timeout period set in seconds or minutes, not hours, automatically disarms the pre-buffer if no trigger occurs. A re-arm delay may be implemented after capture, allowing time for subjects like birds to depart a feeder before the system re-arms for the next capture opportunity. The timeline may also show two-stage arming optimization where wide-area motion detection of birds flying near a feeder triggers targeted sensor activation, only arming the pre-buffer when birds approach the specific feeding perch.

Figure 5:
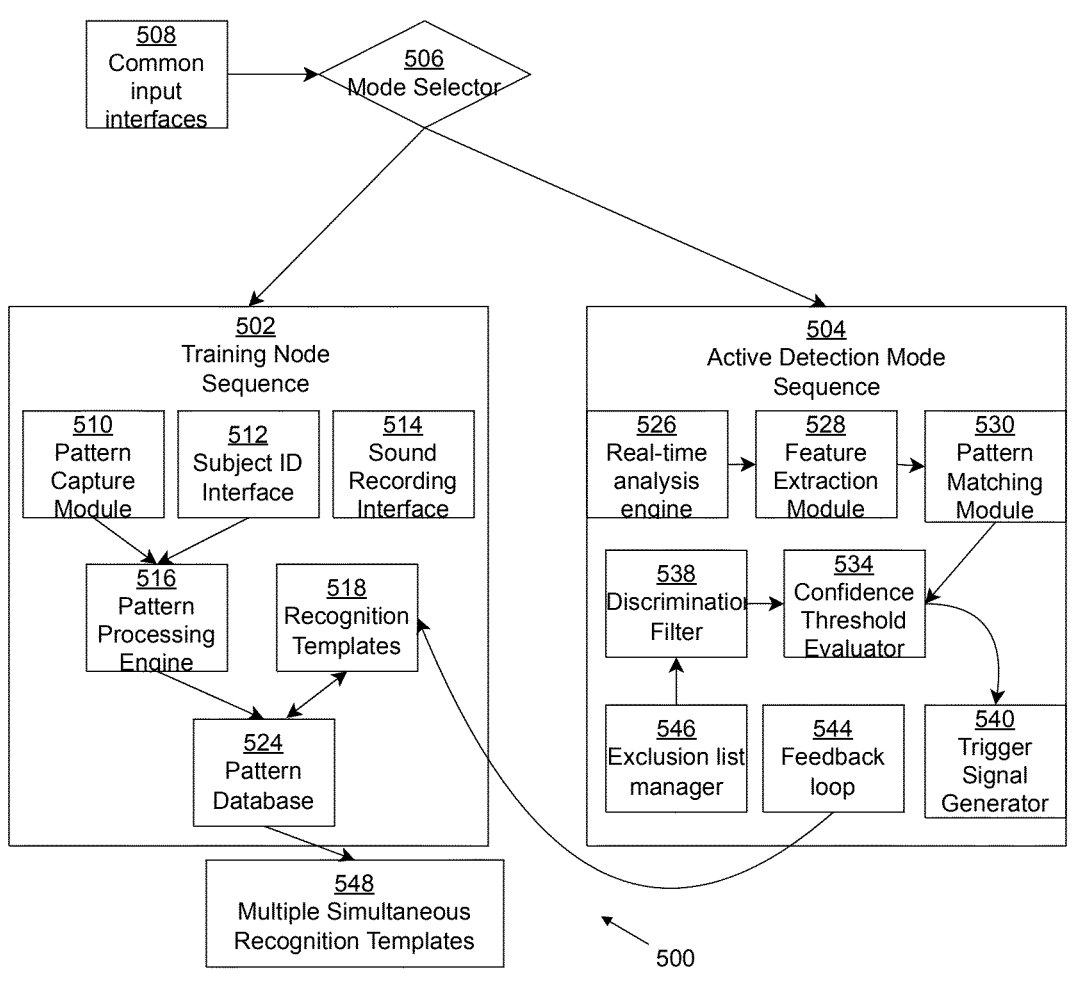
FIG. 5 illustrates a cognitive trigger process, according to an embodiment.

FIG. 5 illustrates a cognitive trigger process flow diagram 500 demonstrating the dual-mode operation of intelligent sensor nodes for discriminating event detection, according to an embodiment. The cognitive trigger process flow diagram 500 illustrates how sensor nodes transcend simple threshold-based triggering through artificial intelligence-enabled recognition of specific subjects and acoustic signatures. The cognitive trigger process flow diagram 500 demonstrates the system's ability to eliminate false positives through user-trainable pattern recognition, enabling capture of specific desired events while ignoring similar but unwanted triggers.

The cognitive trigger process flow diagram 500 may include two primary operational modes: a training mode sequence 502 and an active detection mode sequence 504. A mode selector 506 determines whether the sensor node operates in training mode for establishing recognition patterns or active mode for real-time event detection. The two modes may share common input interfaces 508 including camera input for visual detection such as bird identification, microphone input for sound recognition such as the "thwack" of a slingshot or "pop" of a tennis ball, and other sensor inputs including proximity sensors and accelerometers when embodied in smartphones or tablets.

The training mode sequence 502 may include a pattern capture module 510 that records reference samples of desired trigger conditions. For visual training, a subject identification interface 512 allows users to capture and label specific subjects, such as designating a bird species as "Northern Cardinal" for a bird feeder setup while explicitly excluding other species like finches or squirrels that may create even more motion. For acoustic training, a sound recording interface 514 captures audio samples of specific sounds, such as the unique "swoosh" of a falling object for physics demonstrations, the specific "thwack" of a slingshot firing for balloon destruction shots, or the distinctive "pop" of a tennis ball strike for sports photography. A pattern processing engine 516 analyzes captured samples to extract distinguishing features and create recognition templates 518 that serve as the acoustic fingerprint for reliable triggering.

The recognition templates 518 may include visual feature vectors containing characteristics such as the red coloration and crest shape specific to a Northern Cardinal, distinguishing it from blue jays or other similar-sized birds. An additional embodiment may include acoustic fingerprints that may include the frequency signature of a golf ball strike, the temporal pattern of a champagne cork pop, or the amplitude envelope of a coin hitting water. The templates 518 are stored in a pattern database 524 accessible during active detection mode, allowing the system to maintain multiple trained patterns for different shooting scenarios such as wildlife photography, sports capture, or scientific experiments.

The active detection mode sequence 504 may include a real-time analysis engine 526 that continuously processes incoming sensor data during "shot mode." A feature extraction module 528 derives characteristics from live sensor inputs matching the format of stored recognition templates 518. A pattern matching module 530 compares extracted features against stored templates using similarity scoring algorithms. A confidence threshold evaluator 534 determines whether similarity scores exceed user-configurable minimum confidence levels, preventing false triggers from background noise or conversation that simple volume triggers would activate.

A discrimination filter 538 actively rejects non-matching inputs, preventing false triggers from similar but distinct subjects or sounds. For visual discrimination at a bird feeder, the filter 538 may reject squirrels despite their movement creating more motion than birds or ignore finches when specifically configured to capture only Northern Cardinals. For acoustic discrimination in sports photography, the filter 538 may ignore crowd noise, conversation, or other court sounds while waiting exclusively for the trained tennis ball "pop" sound. For scientific capture, the filter 538 distinguishes the specific "thwack" of the slingshot from other impacts or sounds. Only when the confidence threshold evaluator 534 confirms a match above the minimum confidence level does a trigger signal generator 540 transmit an event notification to the control node.

The cognitive trigger process flow diagram 500 may include a feedback loop 544 that updates recognition templates 518 based on successful captures, improving accuracy over time through machine learning refinement. For example, after successfully capturing multiple Northern Cardinal landings, the system refines its recognition parameters for even better discrimination. An exclusion list manager 546 maintains patterns to explicitly ignore, such as adding squirrel visual patterns or ambient conversation acoustic patterns to reduce computational load by quickly dismissing known non-targets. The system may support multiple simultaneous recognition templates 548, allowing a single sensor node to trigger on various trained subjects or sounds with different priority levels, such as prioritizing bald eagle detection over smaller birds, or golf ball strikes over practice swings The cognitive trigger process flow diagram 500 demonstrates practical applications across diverse use cases. In wildlife photography, the system enables unattended capture at bird feeders by triggering only on specific species while ignoring others. In sports photography, it captures peak action moments like serves or swings based on trained sound signatures. In portrait photography, it can detect genuine smiles versus posed expressions. In scientific documentation, it captures precisely timed events like balloon destruction or water drop impacts based on specific trained sounds. This cognitive capability transforms the sensor nodes from simple switches reacting to any stimulus into intelligent agents that understand and execute the photographer's specific creative or scientific intent.

Figure 6:
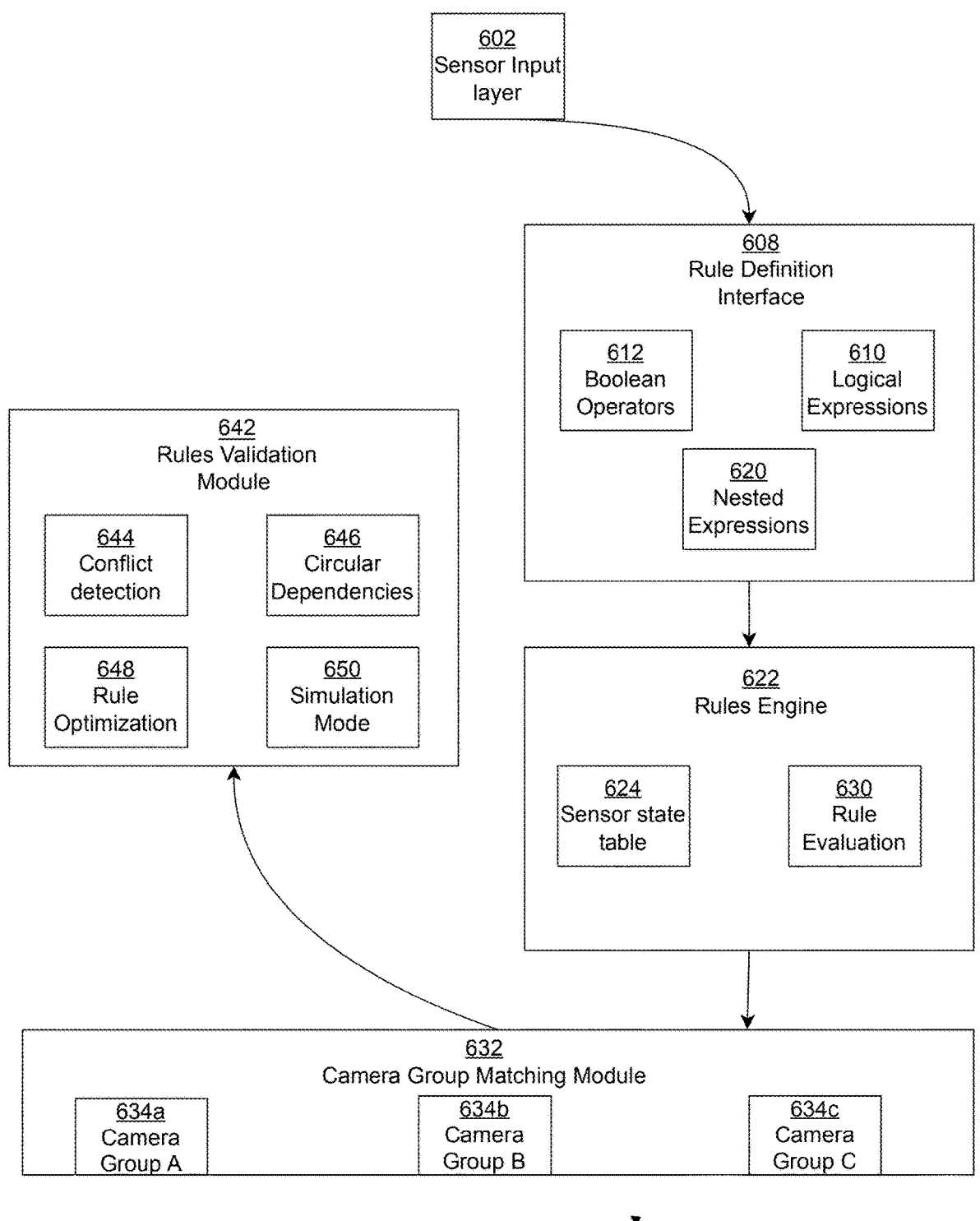
FIG. 6 illustrates a logical rule processing diagram, according to an embodiment.

FIG. 6 illustrates a logical rule processing diagram 600 demonstrating how the control node executes complex Boolean operations on multiple sensor inputs to determine capture triggering decisions, according to an embodiment. The logical rule processing diagram 600 illustrates the system's ability to combine diverse sensor events through programmable logic, enabling sophisticated conditional triggering beyond simple one-to-one sensor-camera relationships. The logical rule processing diagram 600 demonstrates how multiple distributed sensors can be logically combined to trigger specific camera groups under precise conditions, such as coordinating coverage at a baseball game or managing complex wildlife photography setups.

The logical rule processing diagram 600 may include a sensor input layer 602 comprising multiple sensor event signals 604 from distributed sensor nodes. The sensor event signal 604 may include event metadata 606 containing sensor identification 606a, event type 606b, confidence level 606c, and timestamp 606d. The sensor input layer 602 may accommodate dynamic addition or removal of sensor nodes without reconfiguration of existing logical rules. Sensor types may include binary state sensors, analog value sensors, event-triggered sensors, and variable state sensors, providing standardized metadata regardless of underlying sensor technology.

A rule definition interface 608 may include user-configurable logical expressions 610 that define relationships between sensor inputs using Boolean operators. The logical expressions 610 may employ AND operators 612 requiring multiple conditions to be simultaneously true, OR operators 614 triggering when any specified condition occurs, XOR operators 616 for exclusive conditions, and NOT operators 618 for inverse logic. Complex nested expressions 620 may combine multiple operator types with parenthetical grouping to define sophisticated triggering scenarios involving any combination of available sensors.

The logical rule processing diagram 600 may include a rules engine 622 that evaluates incoming sensor events against defined logical expressions 610. A sensor state table 624 maintains current status of all registered sensors, including binary triggered/idle states 626 and analog value levels 628 where applicable. The rules engine 622 may continuously update evaluations as sensor states change, processing rules in priority order 630 when multiple rules are defined. The engine supports real-time state monitoring and immediate rule evaluation upon any sensor state transition.

A camera group mapping module 632 associates logical rule outcomes with specific capture node groups 634. Camera groups may be pre-defined as functional sets such as Camera_Group_A 634a, Camera_Group_B 634b, or Camera_Group_C 634c, with the group containing cameras configured for specific capture parameters. The mapping module 632 may support one-to-many relationships where a single rule outcome triggers multiple camera groups, and many-to-one relationships where different rules can trigger the same camera group.

The logical rule processing diagram 600 may include generic rule expression capabilities 636 demonstrating the system's flexibility across diverse applications. Generic rule patterns may include simple conjunctive expressions such as "(Sensor_1 AND Sensor_2) OR Sensor_3" for scenarios requiring multiple confirmatory inputs or single override conditions. Complex threshold-based expressions such as "(Sensor_N>threshold_value) AND (NOT Sensor_2)" enable conditional triggering based on analog sensor values while excluding conflicting sensor states. Nested expressions combining multiple operator types provide sophisticated logical control over capture triggering decisions.

A rule validation module 642 may check for logical conflicts 644 and circular dependencies 646 in user-defined rules. The validation module 642 may provide suggestions for rule optimization 648, identifying redundant conditions or proposing simplified equivalent expressions. A simulation mode 650 may allow users to test rules with synthetic sensor inputs before deployment, visualizing which cameras would trigger under various sensor state combinations. The validation system ensures logical consistency and optimal performance regardless of the specific sensor types or camera configurations deployed.

Figure 7:
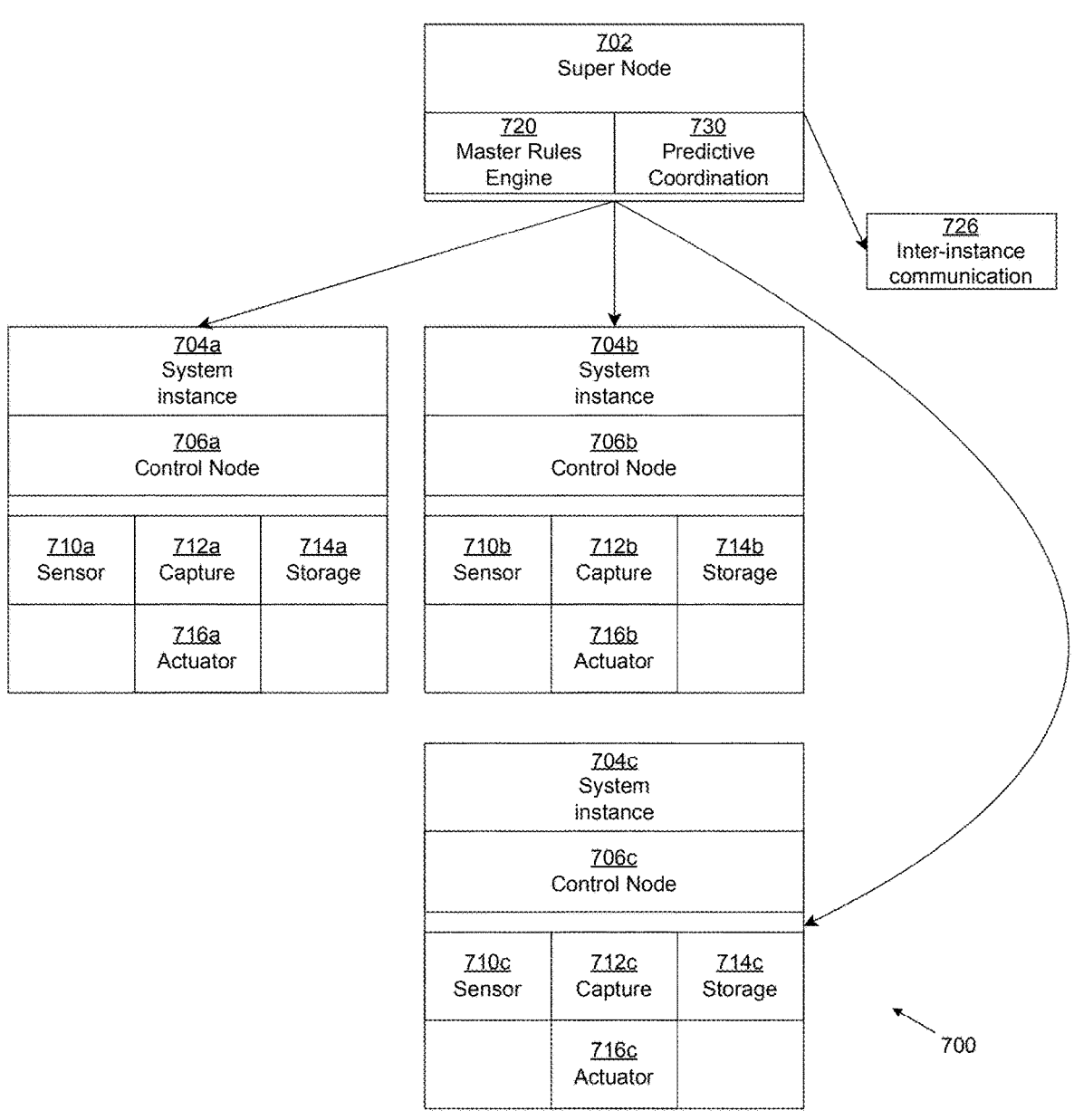
FIG. 7 illustrates a hierarchical super node architecture diagram, according to an embodiment.

FIG. 7 illustrates a hierarchical super node architecture diagram 700 demonstrating the system's scalability through coordinated control of multiple independent system instances, according to an embodiment. The hierarchical super node architecture diagram 700 illustrates how the platform transcends single-instance limitations such as Bluetooth Low Energy saturation at 8-10 devices through a distributed "system of systems" approach. The hierarchical super node architecture diagram 700 demonstrates the ability to coordinate large-scale deployments across vast areas while maintaining unified control through a "divide and conquer" strategy The hierarchical super node architecture diagram 700 may include a super node 702 positioned at the apex of the hierarchy, functioning as a meta-controller that orchestrates multiple complete system instances 704. The super node 702 does not directly control individual cameras or sensors but instead communicates with the control nodes of the subordinate system instance through their external API interfaces. The system instance 704*a-c* maintains full autonomous capability while also responding to super node coordination commands, enabling deployments that would be impossible for any single instance to achieve.

A first system instance 704*a* may comprise its own complete node architecture including a control node 706*a*, multiple sensor nodes 710*a*, multiple capture nodes 712*a*, storage nodes 714*a*, and actuator nodes 716*a*. In a large sports stadium deployment, the first system instance 704*a* may be deployed to cover the cast goal area with its own cameras, sensors, and control logic. The instance operates independently with its own logical rules and sensor triggers while maintaining communication with the super node 702 for coordinated multi-zone captures.

A second system instance 704*b* covering the midfield zone and a third system instance 704*c* covering the west goal may be similarly configured with complete node architectures. The instance may have different quantities and types of nodes optimized for their specific coverage requirements. For example, the midfield instance 704*b* may emphasize wide-angle capture nodes for general play, while the goal instances 704*a* and 704*c* may use high-speed cameras configured for shot-on-goal captures. This distributed approach provides virtually limitless scalability, redundancy, and the ability to cover vast or complex environments that exceed single-instance communication link saturation.

The super node 702 may include a master rules engine 720 that processes higher-level logical conditions based on events from any subordinate instance. When a "shot on goal" event is detected by sensors in the cast goal instance 704*a*, the super node 702 may issue coordinated capture commands 724 to all three instances simultaneously, capturing the action and reaction from every angle in the stadium. This enables scenarios where an event detected in one zone triggers synchronized capture across the entire deployment area, achieving a scale of coordination impossible for any single instance.

Inter-instance communication pathways 726 may utilize high-level event notifications rather than raw sensor data, preventing bandwidth saturation that would occur with direct sensor-to-sensor communication across instances. The super node 702 may receive event summaries containing only essential metadata such as "shot detected," confidence level, and timestamp, rather than full sensor payloads. This architectural separation ensures scalability to hundreds of instances without communication bottleneck, overcoming limitations such as BLE's practical limit of 8-10 devices.

The hierarchical super node architecture diagram 700 may include a predictive coordination module 730 enabling sophisticated time-based and data-focused workflows over large areas. For tracking a golf drive on a long par 5 hole, detecting a ball strike at a tec box instance using a microphone sensor may trigger the super node 702 to send predictive "prepare and arm" commands to a second instance located 300-400 yards down the fairway with appropriate timing delay based on typical ball flight time. This fairway instance, armed and ready, could use its own sensors such as a LiDAR scanner to precisely measure the ball's landing point and the length of its roll-out. This predictive capability extends the system from reactive to proactive capture, demonstrating its function as a versatile, distributed data acquisition platform where the primary utility is not just capturing photos but acquiring valuable performance data.

The super node architecture enables complex deployments previously impossible due to technical limitations. A wildlife research station may deploy instances across multiple watering holes, with the super node coordinating captures when animals move between locations. A motorsports track may position instances at each corner, with the super node ensuring complete coverage as vehicles progress through the circuit. Scientific experiments may use instances in different laboratories, with the super node synchronizing data collection across facilities. The architecture's API-based integration allows the instances to use different communication technologies on a per-device basis. One instance may use BLE for local sensors, another WIFI for broader coverage, and a third may combine wired Ethernet for fixed cameras with wireless sensors, all coordinated seamlessly through the super node. This hierarchical architecture enables the platform for industrial-scale content creation workflows for spatial computing and metaverse applications, where synchronized multi-angle capture across vast areas is used for immersive environment reconstruction.

Figure 8:
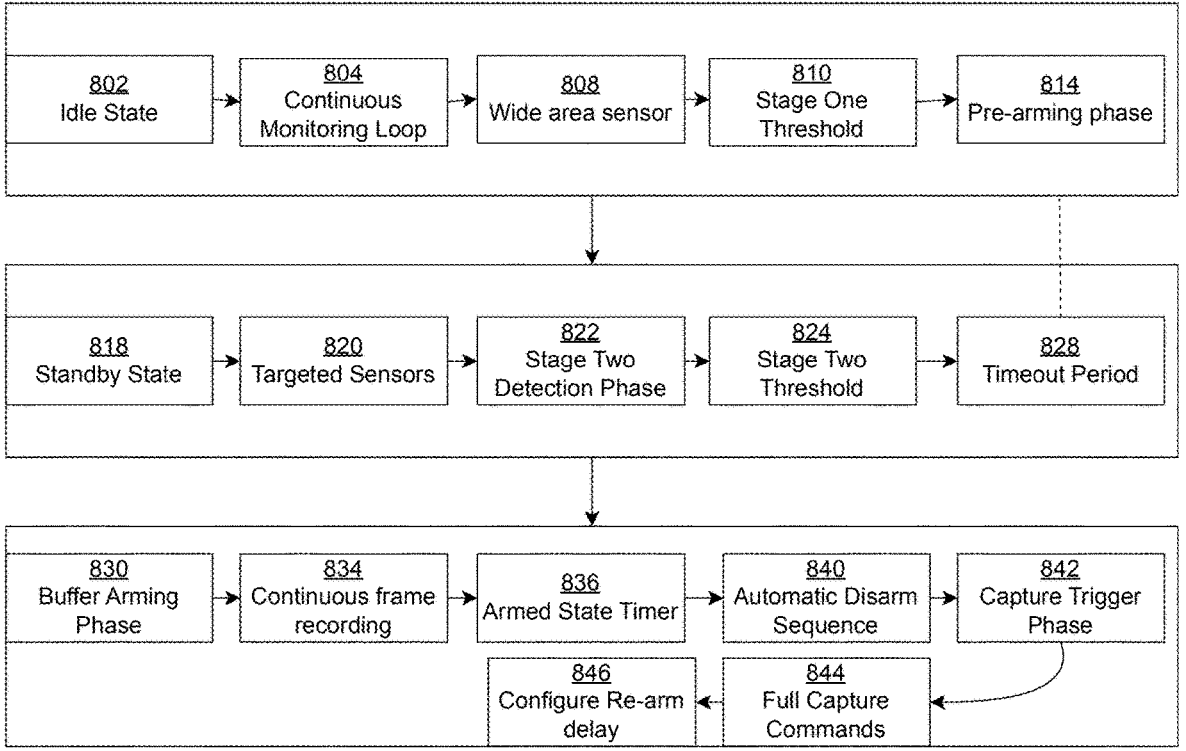
FIG. 8 illustrates a two-stage arming sequence, according to an embodiment.

FIG. 8 illustrates a two-stage arming sequence flowchart 800 demonstrating intelligent resource management for pre-shoot buffer activation, according to an embodiment. The two-stage arming sequence flowchart 800 illustrates how the system prevents unnecessary battery consumption, thermal buildup, and memory wear by implementing conditional buffer activation. The two-stage arming sequence flowchart 800 demonstrates a hierarchical triggering approach that maintains readiness while protecting camera hardware from continuous buffer operation that could cause overheating.

The two-stage arming sequence flowchart 800 may begin with an idle state 802 where all capture nodes maintain standard ready mode without pre-buffer activation. In the idle state 802, cameras consume minimal power and generate negligible heat while sensor nodes remain active for monitoring. A continuous monitoring loop 804 evaluates wide-area sensor inputs for general activity indicators without committing camera resources, avoiding the undesirable situation of indefinite pre-buffer arming.

A stage one detection phase may be initiated by a wide-area sensor 808 detecting general activity within a broad monitoring zone. For a bird feeder deployment, the wide-area sensor 808 may comprise a wide-angle camera detecting birds flying in the general scene where the feeder is situated, a sound level monitor detecting bird calls, or an environmental sensor detecting lighting changes from bird shadows. A stage one threshold evaluator 810 determines whether detected activity such as birds in flight meets minimum criteria for proceeding to stage two.

Upon meeting stage one criteria, a pre-arming phase 814 may send preliminary activation signals to relevant capture nodes. The capture nodes transition to a standby state 818 with increased readiness but without engaging pre-buffer recording, conserving battery usage and minimizing thermal issues. Simultaneously, targeted sensors 820 specific to the desired capture event are activated or heightened in sensitivity. For example, once stage one detects birds flying near a feeder, stage two activates a narrow-focus sensor trained directly on the feeder perch or a pressure plate on the feeder itself.

A stage two detection phase 822 monitors the targeted sensors 820 for specific trigger conditions. A stage two threshold evaluator 824 applies more stringent criteria than stage one, looking for precise event signatures such as a bird actually approaching the perch or the pressure plate detecting weight. If stage two criteria are not met within a timeout period 828, the system returns to idle state 802, preventing indefinite readiness that would drain resources and cause premature component wear.

Upon meeting stage two criteria, a buffer arming phase 830 sends pre-buffer activation commands to designated capture nodes. The capture nodes begin continuous frame recording 834 into their internal high-speed buffers, such as the Sony A9III recording at 120 frames per second. An armed state timer 836 monitors the duration of buffer operation, implementing a maximum armed period configurable in seconds or minutes, not hours, to prevent overheating. If no capture trigger occurs before timeout, an automatic disarm sequence 840 returns the system to idle state 802.

A capture trigger phase 842 occurs when final sensor conditions are met while the buffer is armed. For the bird feeder example, this may be when the bird fully lands on the pressure plate, triggering capture of both the landing sequence and subsequent feeding behavior. The system executes full capture commands 844, storing both pre-buffer frames showing the bird's approach and post-trigger frames to permanent storage. After successful capture, a configurable re-arm delay 846 prevents immediate re-activation, allowing the bird to feed and eventually depart before the system re-arms for the next bird. The re-arm delay 846 accounts for continuing pressure events while the bird remains on the feeder.

The two-stage arming sequence flowchart 800 may include adaptive threshold adjustment for persistent subjects. Once a bird lands on the feeder, the pressure sensor logic could adjust its "floor" to the weight of the bird being on it, and once it departs, the loss of pressure could trigger another "shoot" command to capture the departure. This adaptive approach enables capturing both arrival and departure sequences without manual intervention while still protecting camera resources through intelligent timeout management.

FIG. 9 illustrates a control plane and data plane separation diagram 900 demonstrating the telecommunications-grade architectural principle applied to the camera control platform, according to an embodiment. The control plane and data plane separation diagram 900 illustrates how the system maintains reliability and scalability by segregating low-bandwidth control operations from high-bandwidth media transfer operations. The control plane and data plane separation diagram 900 demonstrates how carrier-grade design principles, adapted from telecommunications network architectures to address scalability and reliability challenges in distributed photography systems, enable the platform to scale from single-camera deployments to stadium-wide installations without architectural modification.

The control plane and data plane separation diagram 900 may include a control plane layer 902 handling all signaling, commands, and system orchestration. The control plane 902 operates with low-bandwidth requirements, typically under 1 megabit per second even for large deployments. Control plane traffic 904 includes sensor event notifications such as a "shoot" command from an iPhone detecting a photo event, capture commands which are typically just a small number of bytes, status messages, rule updates for logical AND/OR/XOR/NOT operations, and synchronization signals. These messages are deliberately kept small for speed and ease of implementation, requiring reliable, low-latency delivery.

A data plane layer 906 may handle all media transfer operations including high-resolution images from Sony A9III captures, RAW files from scientific experiments, and video files from sports coverage. The data plane 906 accommodates high-bandwidth requirements, potentially exceeding gigabits per second for multi-camera broadcast-resolution video capture such as stadium deployments with dozens of cameras. Data plane traffic 908 includes RAW image files from water balloon destruction sequences, compressed video streams from continuous bird feeder monitoring, audio recordings, and metadata packages containing sensor trigger information and AI classifications.

The control plane 902 may utilize lightweight protocols 910 optimized for responsiveness, chosen for ease of implementation and speed. Bluetooth Low Energy connections provide power-efficient local communication with millisecond-level latency, enabling the original implementation where devices could trigger other cameras in the array. UDP multicast enables efficient one-to-many event broadcasting for Super Node coordination. WebSocket connections maintain persistent channels for real-time bidirectional communication with external systems receiving weather alerts. Message queuing protocols ensure reliable delivery of commands even during network disruptions.

The data plane 906 may employ high-throughput protocols 912 optimized for bulk transfer of captured media. TCP-based file transfer ensures reliable delivery of complete media files such as high-speed balloon destruction sequences with automatic retransmission of lost packets. Chunked HTTP uploads enable resumable transfers for large video files over unreliable connections. Network-attached storage protocols provide direct storage to NAS devices without intermediate processing. Cloud storage APIs facilitate automatic backup to remote storage services for archiving scientific experiment results.

A plane isolation boundary 914 may maintain strict separation between control and data operations, an architectural choice ensuring system scalability and reliability. The boundary 914 prevents data plane congestion from heavy media transfers from affecting control plane responsiveness, ensuring capture commands execute reliably even when multiple storage nodes are transferring gigabytes of photogrammetry images. Quality of service policies 916 prioritize control plane packets containing "shoot" commands over data plane packets transferring previously captured images. Buffer management 918 allocates separate memory pools for control and data operations, preventing large media files from coin drop experiments from exhausting resources needed for time bird feeder triggers.

The control plane and data plane separation diagram 900 may include crossover points 920 where planes interact through defined interfaces. According to another embodiment, A capture initiation interface translates control plane capture commands into data plane media generation, such as converting a pressure plate trigger into a burst sequence capture. A transfer scheduling interface coordinates when and how media files move through the data plane based on control plane priorities, ensuring wildlife captures reach cloud storage before routine time-lapse frames. A status reporting interface feeds data plane transfer progress back to the control plane for system monitoring without overwhelming control channels with detailed transfer statistics.

The inter-device communication flexibility enabled by this architecture allows mixed technology deployment on a per-device basis. One camera may be under BLE control for proximity and power efficiency, another using WIFI for broader coverage, with a BLE-connected iPhone using LiDAR sensing for specific distance triggers useful for precise manual focus, and a Raspberry Pi connected over WIFI with an elaborate laser-LED tripwire trigger. This heterogeneous communication approach, unconventional in photography but standard in telecommunications, represents the cross-pollination of disparate technical fields.

Figure 10:
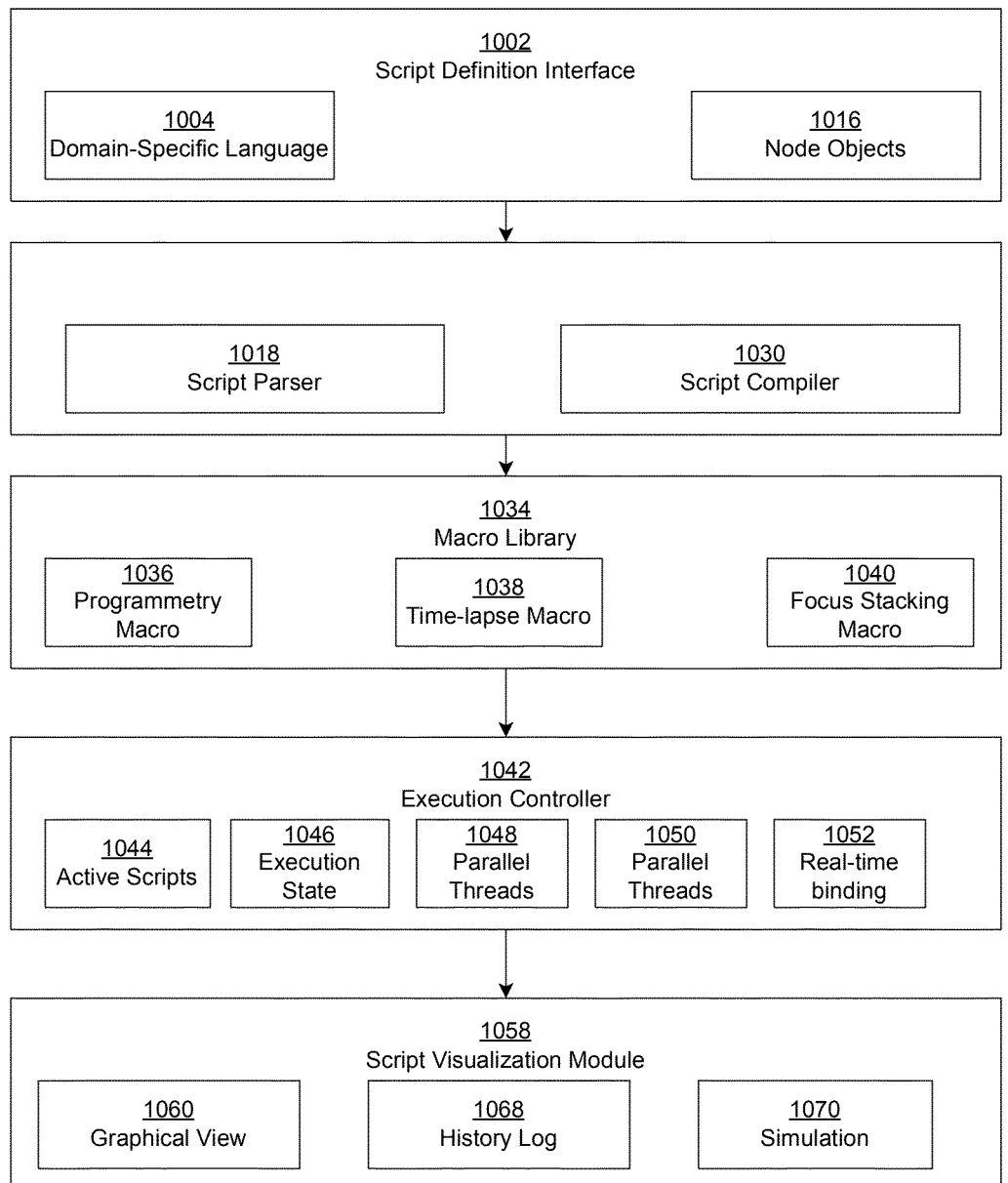
FIG. 10 illustrates a scripting engine workflow diagram, according to an embodiment.

FIG. 10 illustrates a scripting engine workflow diagram 1000 demonstrating programmable automation for complex multi-step capture sequences, according to an embodiment. The scripting engine workflow diagram 1000 illustrates how the platform transforms from reactive triggering to proactive workflow orchestration through user-definable scripts. The scripting engine workflow diagram 1000 demonstrates the system's capability to execute sophisticated capture routines combining sensors, cameras, and physical actuators in coordinated sequences, enabling complete workflow automation for scientific, creative, and industrial applications.

The scripting engine workflow diagram 1000 may include a script definition interface 1002 where users create automation sequences using a domain-specific language 1004. The language 1004 may support standard programming constructs including loop structures for repeating capture sequences, conditional statements for adaptive behavior, variable assignments for tracking state, timing delays for synchronization, and function calls for modular operations. Scripts may reference node objects 1016 directly, treating cameras, sensors, and actuators as programmable entities with methods and properties, transforming photography from single moment capture to engineered workflow execution.

A script parser 1018 may validate user-defined scripts for syntax errors and logical inconsistencies. The parser 1018 may identify unreachable code, infinite loops that could lock the system, and resource conflicts where multiple scripts attempt simultaneous control of the same turntable or camera. A script compiler 1030 may convert validated scripts into optimized execution plans that minimize inter-node communication and maximize parallel operations where possible, essential for complex photogrammetry sequences.

The scripting engine workflow diagram 1000 may include a macro library 1034 containing pre-defined script templates for common workflows. A photogrammetry macro 1036 may automate 360-degree capture by commanding an actuator node to rotate a turntable by a precise degree, implementing a programmed delay for stabilization, commanding capture nodes to fire say four cameras, then repeating the entire sequence until a full 360-degree shoot is complete with 180 capture positions. A time-lapse macro 1038 may capture at defined intervals with automatic exposure adjustment based on ambient light sensor readings. A focus stacking macro 1040 may systematically adjust camera focus through predetermined ranges while capturing the position for scientific documentation.

An execution controller 1042 may manage active script instances 1044 running concurrently or sequentially. The controller 1042 may maintain execution state 1046 for the script including current line number, variable values tracking turntable position, and loop counters for repetition control. Parallel execution threads 1048 enable multiple non-conflicting scripts to run simultaneously, such as different camera groups executing independent capture sequences at a baseball game. A priority scheduler 1050 resolves conflicts when scripts compete for shared resources, suspending lower-priority scripts until resources become available.

The scripting engine workflow diagram 1000 may include real-time variable binding 1052 linking script variables to live sensor values and system states. Dynamic conditionals enable scripts to adapt behavior based on environmental conditions, such as activating flash when light sensors detect low ambient levels during automated product photography. Event-driven triggers allow scripts to pause execution until specific sensor events occur, combining programmatic control with reactive responsiveness, such as waiting for a pressure plate trigger before initiating a scientific experiment with a solenoid valve.

A script visualization module 1058 may provide graphical representation 1060 of script execution flow, highlighting currently executing commands such as "ROTATE TURNTABLE 2DEGREES" and showing upcoming operations like "SHOOT CAMERAS 1-4." Debug breakpoints enable step-by-step execution for testing complex scripts before committing to full photogrammetry runs. An execution history log 1068 records all script actions with timestamps, facilitating troubleshooting and performance optimization for industrial applications. The visualization module 1058 may simulate script execution 1070 using virtual nodes before deployment to physical hardware.

The scripting capability's exposure via the Control Node's API allows external systems to programmatically define and execute complex capture and automation routines. This extensibility transforms the system from a reactive trigger into a fully programmable platform accessible to broader automation systems. The scripting engine represents an unconventional intersection of programming paradigms with photography, where a photoshoot is treated as an engineering workflow to be programmed and executed rather than a single moment to be captured. This approach, derived from telecommunications system management where scripting automated sequences is ubiquitous, introduces tools to photography that were never there before, exemplifying how this bridges disparate technical fields in non-obvious ways.

Figure 11:
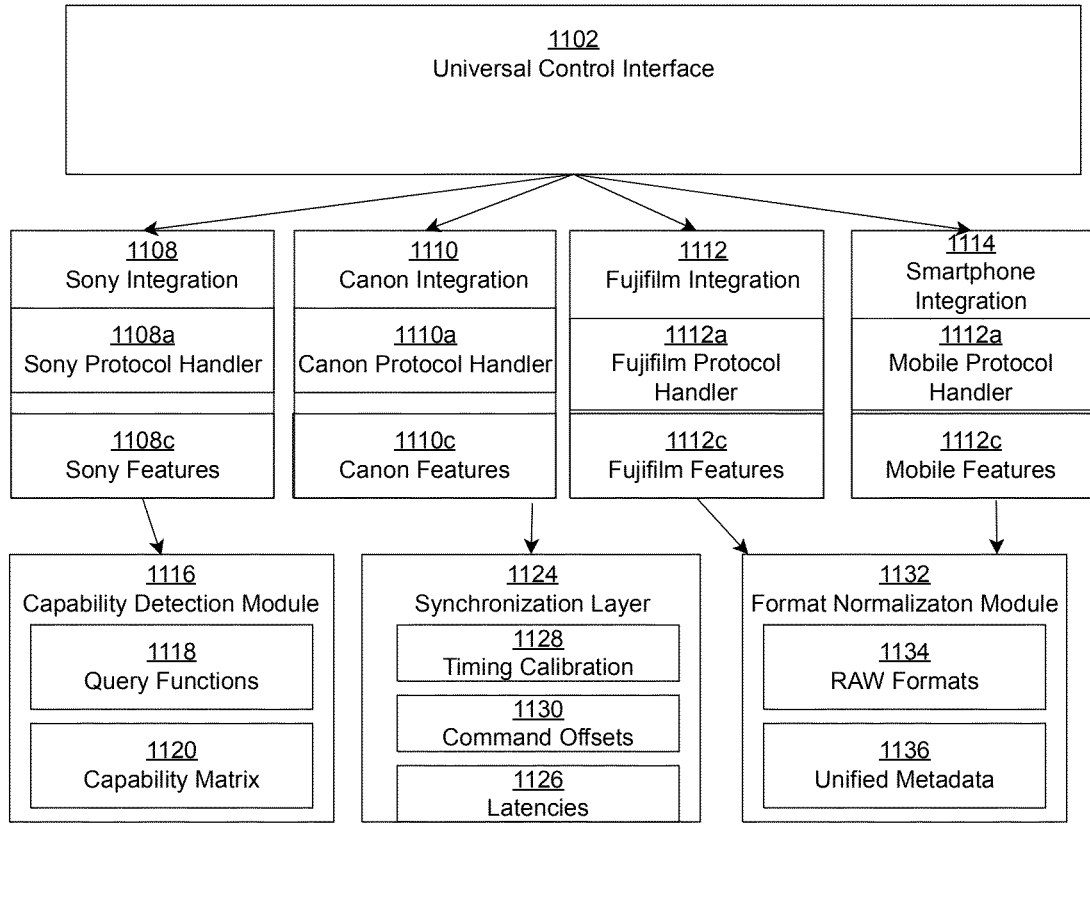
FIG. 11 illustrates a cross-manufacturer integration diagram, according to an embodiment.

FIG. 11 illustrates a cross-manufacturer integration diagram 1100 demonstrating the platform's ability to unify heterogeneous camera equipment under single-point control, according to an embodiment. The cross-manufacturer integration diagram 1100 illustrates how the system overcomes proprietary communication barriers to enable simultaneous control of cameras from different manufacturers, solving the limitation where existing applications can connect to multiple cameras from different vendors but cannot fire them simultaneously. The cross-manufacturer integration diagram 1100 demonstrates the vendor-agnostic architecture that liberates users from single-manufacturer lock-in while maintaining full feature access including pre-buffer control.

The cross-manufacturer integration diagram 1100 may include a universal control interface 1102 that abstracts manufacturer-specific protocols into common command structures. The interface 1102 may translate generic commands such as "capture," "arm pre-buffer," and "adjust settings" into appropriate vendor-specific API calls. The manufacturer integration may require distinct protocol handlers implementing manufacturer SDKs, proprietary communication protocols, and device-specific timing requirements, enabling the capture nodes to be a mix of manufacturers operating seamlessly together.

A first manufacturer integration 1108 may support cameras from Sony Corporation including professional models such as the A9III with advanced pre-buffer capabilities supporting 120 fps pre-capture mode. The Sony protocol handler 1108a may implement Camera Remote SDK commands 1108b over WIFI and USB connections. Sony-specific features 1108c such as 120 fps pre-capture mode enabling capture of bird flight sequences and blackout-free shooting may be exposed through normalized interface methods that hide implementation complexity from higher-level control logic.

A second manufacturer integration 1110 may support Canon cameras including DSLRs and mirrorless models that may lack pre-buffer features. The Canon protocol handler 1110a may implement EDSDK commands with different connection methods than Sony devices. A third manufacturer integration 1112 supporting Fujifilm cameras such as the X-T5 with its own pre-capture capabilities, and a fourth manufacturer integration 1114 supporting smartphone cameras including iPhones and iPads, may similarly implement their respective protocols while presenting uniform control interfaces. The system accommodates cameras that may shoot in still, burst, or movie mode on a per-device basis.

A capability detection module 1116 may automatically enumerate features available on the connected camera. The module 1116 may query the camera for supported functions 1118 including pre-buffer availability, maximum frame rate, resolution options, and remote-control capabilities. For example, the Sony A9III would report 120 fps pre-buffer support while a Canon DSLR might report no pre-buffer capability. A capability matrix 1120 may maintain real-time status of the camera's features, enabling the control node to issue commands only to cameras capable of executing them. Graceful degradation logic ensures cameras lacking pre-buffer features will still shoot normally under the same command set, just without capturing frames before the actual "shoot" command.

The cross-manufacturer integration 1100 may include a synchronization layer 1124 compensating for timing differences between manufacturer implementations. Different cameras exhibit varying latencies 1126 between command receipt and execution, potentially causing temporal misalignment in multi-camera captures of events like coin drops or balloon destruction. A timing calibration process 1128 may measure individual camera response times and apply appropriate command offsets 1130 ensuring simultaneous capture despite heterogeneous hardware. The synchronization layer 1124 may maintain microsecond-level precision across mixed camera arrays necessary for scientific documentation.

A format normalization module 1132 may handle disparate file formats and naming conventions from different manufacturers. RAW formats 1134 including Sony's ARW from A9III captures, Canon's CR3, Fujifilm's RAF from X-T5, and smartphone HEIC/JPEG may be tagged with unified metadata 1136 for consistent downstream processing. The module 1132 may preserve manufacturer-specific metadata while adding standardized fields for trigger source (pressure plate, motion sensor, sound trigger), capture group (home plate cameras, feeder cameras), and timing information, enabling seamless integration in mixed-manufacturer workflows.

The cross-manufacturer integration overcomes the current state where hardware-based button remotes lack the "half-press" feature needed to arm the pre-capture buffer, and software applications either cannot connect to multiple cameras from different vendors or cannot fire them simultaneously. This integration enables scenarios previously impossible, such as using a Sony A9III for high-speed pre-buffer capture of a bird taking flight, while simultaneously triggering a Fujifilm X-T5 for wider context shots and an iPhone for behind-the-scenes documentation, all initiated by the same sensor detection of the bird's first wing movement. In one embodiment, a control node operation within a first software ecosystem may command capture nodes operating within different software ecosystems, providing unified multi-platform camera coordination regardless of underlying device operating systems or manufacturer software environments. The platform's ability to coordinate these disparate systems through a single control interface while maintaining the camera's unique capabilities represents a significant advancement over existing 1:1 hardware triggers and single-vendor software solutions.

FIG. 12 illustrates an event metadata enrichment and intelligent media processing flow 1200 demonstrating how storage nodes automatically analyze, classify, and optimize captured content, according to an embodiment. The event metadata enrichment diagram 1200 illustrates the system's post-capture intelligence that transforms raw media into organized, searchable, and optimized assets. The event metadata enrichment diagram 1200 demonstrates how artificial intelligence applied at the storage layer reduces manual curation effort while preserving important moments from experiments like balloon destruction and discarding redundant frames from pre-buffer sequences.

The event metadata enrichment flow diagram 1200 begins by receiving captured images and video from multiple capture nodes through a media ingestion pipeline 1202. The system ingests raw media files containing basic EXIF data and initial trigger metadata, then queues incoming media for processing based on available computational resources.

The flow proceeds to analyze pre-buffer sequences using a frame redundancy analyzer 1204. The system applies perceptual hashing to detect duplicate frames, compares pixel-level differences against thresholds, and performs motion vector analysis to identify movement onset. The process automatically deletes static frames while preserving critical action frames.

The retained media advances to an AI classification engine 1206 that processes content through multiple recognition models. The system executes subject identification, performs action recognition, conducts scene analysis, and evaluates quality assessment to comprehensively analyze media content.

The classified data flows to a metadata synthesis module that combines AI-derived classifications with original capture context 1208. The process generates enriched metadata tags, creates hierarchical categorizations, produces natural language descriptions, and assigns confidence scores to each classification.

The enriched media proceeds through a media optimization processor that creates derivative versions for different purposes 1210. The system generates thumbnails and proxy files, extracts highlight clips, performs format transcoding, and applies HDR tone mapping to optimize content for platforms and display requirements.

The final stage routes processed media through a distribution controller based on metadata and user preferences 1212. The system executes cloud synchronization, manages local archive organization, performs project-based routing, and sends webhook notifications to complete the intelligent media processing workflow. When embodied in a typical smartphone, the storage node may save images to the local photo library. Project-based routing may direct coin drop physics demonstrations to educational repositories while bird feeder captures go to wildlife portfolios. Webhook notifications may alert external systems when media matching specific patterns is captured and processed.

The intelligent processing capabilities transform what would normally be thousands of frames from pre-buffer sequences into curated collections of peak moments. For the water balloon destruction sequence, the system automatically identifies and preserves the frames showing the rock entering, the balloon deforming, and the subsequent destruction, while discarding hundreds of identical frames before the action. This automated curation, combined with AI classification identifying the subject as "Physics Demonstration" and the action as "High-Speed Impact," enables researchers and educators to quickly locate specific experimental captures among thousands of files. The system's ability to differentiate when the preceding frame is different from the current one and discard all earlier frames ensures storage efficiency while preserving the complete action sequence that justified the entire automated photoshoot.

The counterintuitive approach of embracing system latency rather than attempting to minimize it, combined with programmatic control of a camera feature designed for manual operation, produces the unexpected result that slower sensor-to-camera communication can achieve better capture success than faster direct triggers, fundamentally challenging the prevailing assumption in photography that reducing latency is the primary path to capturing fleeting moments.

A feature illustrated in one of the figures may be the same as or similar to a feature illustrated in another of the figures. Similarly, a feature described in connection with one of the figures may be the same as or similar to a feature described in connection with another of the figures. Unless expressly described otherwise, the same or similar features may be noted by the same or similar reference characters. Additionally, the description of a particular figure may refer to a feature not shown in the particular figure. The feature may be illustrated in and/or further described in connection with another figure.

Elements of processes (i.e., methods) described herein may be executed in multiple ways, such as by a human, a processing device, mechanisms operating automatically or under human control, and so forth. Additionally, although various elements of a process may be depicted in the figures in a particular order, the elements of the process may be performed in one or more different orders without departing from the substance and spirit of the disclosure herein.

The preceding description sets forth numerous details such as examples of specific systems, components, methods, and so forth, to provide a good understanding of several implementations. However, it will be apparent to one skilled in the art that at least some implementations may be practiced without these specific details. In other instances, well-known components or methods are not described in detail or are presented in simple block diagram format to avoid unnecessarily obscuring the present implementations. Thus, the specific details set forth above are merely exemplary. Particular implementations may vary from these exemplary details and still be within the scope of the present implementations.

Related elements in the examples and/or embodiments described herein may be identical, similar, or dissimilar in different examples. For brevity and clarity, related elements may not be redundantly explained. Instead, the use of same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions, and/or properties disclosed above both explicitly and inherently. Where the disclosure or subsequently filed claims recite "a" element, "a first" element, or any such equivalent term, the disclosure or claims are to be understood to incorporate one or more such elements, neither requiring nor excluding two or more such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief Description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the element's A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B, and C; A, B, C, and D; and so forth. The bounds of an "and/or" list are defined by the complete set of combinations and permutations for the list.

Where multiples of a particular element are shown in a FIG. or figure, and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements, and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A system comprising:
a first sensor node distributed across a monitoring area, wherein the first sensor node comprises:
a camera sensor interface;
a cognitive processing module configured to execute artificial intelligence-based pattern recognition for identifying specific subjects from trained visual templates;
a discrimination filter configured to reject non-matching visual inputs below a configurable confidence threshold to prevent false positive triggers; and
a wireless communication interface configured to transmit trigger event notifications comprising:
sensor identification;
event type;
confidence level; or
timestamp; and
a second sensor node distributed across the monitoring area, wherein the second sensor node comprises:
a microphone interface;

a cognitive processing module configured to execute artificial intelligence-based acoustic fingerprinting for matching specific sound signatures from user-recorded audio samples;
a discrimination filter configured to reject non-matching acoustic inputs below a configurable confidence threshold to prevent false positive triggers; and
a wireless communication interface configured to transmit trigger event notifications comprising event metadata comprising:
sensor identification;
event type;
confidence level; and
timestamp;
a first capture node, wherein the first capture node comprises:
a camera interface configured to control heterogeneous camera equipment through manufacturer-specific protocol handlers;
a pre-buffer controller configured to programmatically manage a camera's pre-shoot buffer comprising:
sending arming commands to initiate continuous frame recording into the camera's internal buffer memory before a trigger occurs;
sending disarming commands; and
implementing configurable timeout periods to prevent thermal damage and memory wear;
a capture execution module configured to command the camera to store both pre-buffer frames captured before the trigger event and post-trigger frames to permanent storage upon receiving a capture command;
wherein the pre-buffer frames include frames captured during a system latency period between trigger event detection and capture command execution, thereby rendering the system latency irrelevant to capturing the desired action;
a second capture node, wherein the second capture node comprises:
a camera interface configured to control cameras from multiple manufacturers;
a pre-buffer controller configured to programmatically manage a camera's pre-shoot buffer comprising:
sending arming commands to initiate continuous frame recording into the camera's internal buffer memory before a trigger occurs;
sending disarming commands; and
implementing configurable timeout periods to prevent thermal damage and memory wear;
a capture execution module configured to command the camera to store both pre-buffer frames captured before the trigger event and post-trigger frames to permanent storage upon receiving a capture command;
wherein the pre-buffer frames comprise frames captured during a system latency period between trigger event detection and capture command execution, thereby rendering the system latency irrelevant to capturing the desired action;
a control node communicatively coupled to the first sensor node, the second sensor node, the first capture node, and second capture node, the control node comprising:
a rules engine configured to process Boolean logical expressions combining multiple sensor inputs using AND, OR, XOR, and NOT operators to determine capture triggering decisions;

a camera group mapping module configured to associate logical rule outcomes with specific groups of capture nodes, enabling targeted triggering of camera subsets based on specific sensor conditions;

an external application programming interface configured to enable integration with external systems and hierarchical control by super nodes;

a scripting engine configured to execute user-defined automation sequences combining sensor triggers, capture commands, and actuator controls with programmable delays, loops, and conditional logic;

a first storage node configured to receive captured media from the first capture node and the second capture node, wherein the first storage node comprises:

a frame redundancy analyzer configured to identify and remove duplicate pre-buffer frames captured before action occurred using perceptual hashing and motion vector analysis;

an artificial intelligence classification engine configured to automatically analyze captured media for subject identification, action recognition, and scene analysis; and a metadata synthesis module configured to generate enriched metadata tags combining artificial intelligence-derived classifications with original trigger context;

wherein the platform implements a two-stage arming sequence comprising:

a first stage using wide-area sensors for general activity detection;

a second stage using targeted sensors for specific event detection before activating the pre-buffer controller, preventing unnecessary battery consumption and thermal buildup from continuous buffer operation.

2. The system of claim 1, further comprising a super node configured to coordinate multiple independent instances of the platform across different geographic zones, wherein:

the super node communicates with control nodes of subordinate platform instances through their external API interfaces to enable synchronized capture across all instances when a sensor event in one instance meets super node trigger criteria; and wherein the super node receives only high-level event summaries rather than raw sensor data to prevent communication bandwidth saturation.

3. The system of claim 1, wherein the cognitive processing module further comprises:

a training mode sequence configured to capture reference samples of desired trigger conditions including visual subjects and acoustic signatures; and an active detection mode sequence configured to continuously compare live sensor inputs against stored recognition templates;

wherein the discrimination filter only generates a trigger event notification when pattern matching confidence exceeds a user-defined minimum threshold, actively rejecting similar but non-matching inputs.

4. The system of claim 1, wherein the control node further comprises a synchronization layer configured to compensate for varying command execution latencies between different manufacturers by:

measuring individual camera response times through a calibration process; and applying appropriate command timing offsets to ensure simultaneous capture across heterogeneous camera arrays despite manufacturer-specific protocol differences.

5. The system of claim 1, wherein the scripting engine further comprises:

a macro library containing pre-defined script templates for:

photogrammetry sequences;

time-lapse capture; and focus stacking operations;

wherein the scripting engine supports real-time variable binding linking script variables to live sensor values, enabling dynamic conditional execution where scripts adapt behavior based on environmental conditions detected by sensor nodes.

6. The system of claim 1, further comprising actuator nodes configured to perform physical actions comprising:

turntable rotation;

solenoid valve operation; and lighting control;

wherein the actuator nodes operate under coordination of the scripting engine to enable automated capture sequences where physical manipulation is synchronized with multi-camera capture events.

7. The system of claim 1, wherein the control node implements a predictive coordination module configured to:

calculate anticipated event timing based on initial trigger detection; and proactively arm downstream capture nodes with appropriate timing delays, enabling preparation of capture nodes for events that will occur at predictable future times in different monitoring zones.

* * * * *